Jan. 5, 1960   R. S. YOUNG   2,920,268
ELECTRIC MEASURING INSTRUMENTS
Filed Feb. 20, 1956   2 Sheets-Sheet 2

Inventor
Reginald Searles Young
By Peck & Peck
Attorneys

United States Patent Office 2,920,268
Patented Jan. 5, 1960

2,920,268

ELECTRIC MEASURING INSTRUMENTS

Reginald Searles Young, Gerrards Cross, England, assignor to The British Aluminium Company Limited, London, England, a company of Great Britain Application February 20, 1956, Serial No. 566,594

Claims priority, application Great Britain February 22, 1955

19 Claims. (Cl. 324—34)

This invention relates to improvements in electrical measuring instruments.

It is an object of the present invention to provide an improved electric measuring instrument which shall be capable of measuring the electrical conductivity of a sample of a metal or an alloy, e.g. aluminium or an alloy thereof, which shall be economic to manufacture and which shall be capable of manufacture in the form of a battery-operated portable instrument the accuracy of which is not substantially influenced by small variations in the battery potential such as are encountered during normal use.

According to one feature of the present invention an electrical measuring instrument capable of measuring the electrical conductivity of a sample of a metal or an alloy comprises a tuned anode tuned-grid valve oscillator stage the output of which is supplied to the input of a detector stage incorporating a meter responsive to the electric current passed by the detector stage and automatic D.C. negative feed-back means connected between the oscillator stage and the negative pole of the H.T. supply.

Preferably the automatic D.C. negative feed-back means comprises a feed-back resistor connected between the cathode of the valve of the oscillator stage and the negative pole of the H.T. supply. Conveniently the detector stage includes a valve having at least a cathode, an anode and a control grid, the latter being connected to the output of the valve of the oscillator stage, e.g. by a resistance-capacitance coupling to the anode of the latter, and the cathodes of the two valves are connected in parallel with each other, with the negative feed-back resistor common to both, the valve of the detector stage being normally biased to cut-off so that the valve in that stage is substantially non-conducting when the oscillator stage is not oscillating.

Advantageously, the tuned-grid circuit of the oscillator stage comprises an inductance having a capacitance, provided by two series-connected capacitors, in parallel therewith and the positive feed-back between the tuned-anode circuit of the oscillator stage and the tuned-grid circuit is provided by a variable capacitor connected between the anode of the oscillator valve and the junction of the two series-connected capacitors.

In order that the invention may be clearly understood one form thereof will now be described by way of example with reference to the accompanying drawings in which.

Figure 1:
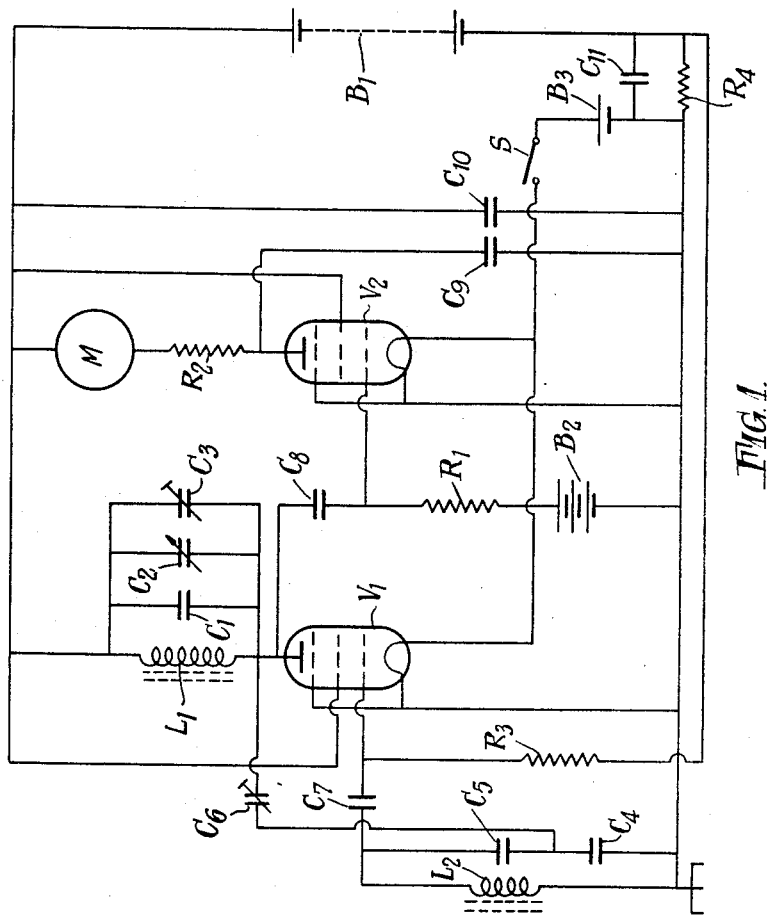
Figure 1 is a circuit diagram of an electrical measuring instrument according to the invention.

The circuit of the electrical measuring instrument shown in Figure 1 is for a portable battery operated instrument for measuring the electrical conductivity of a sample of metal and comprises a tuned-anode tuned-grid oscillator stage the output of which is fed to a detector stage. The oscillator stage comprises a pentode valve $V_1$ which is prefereably a type 1T4 vari-mu pentode valve which under operating conditions draws only a very small grid current and has a cut-off characteristic which is favourable to stable oscillation. The anode $V_1$ is connected through an inductor $L_1$ to the positive side of an H.T. battery $B_1$ and the screen grid of the valve $V_1$, the suppressor grid being strapped to one side of the cathode and connected to the chassis of the instrument. Connected in parallel with the coil $L_1$ and with each other are three capacitors $C_1$, $C_2$ and $C_3$, the capacitor $C_1$ being shown as having a predetermined fixed capacitance, the capacitor $C_2$ being variable and being calibrated in units of electrical conductivity and the capacitor $C_3$ being an air trimmer capacitor. If desired the capacitor $C_1$ may be variable in steps to select ranges of conductivities measurable by the instrument. The tuned-grid circuit comprises an inductor $L_2$ having two series-connected capacitors $C_4$ and $C_5$ connected in parallel therewith, the capacitor $C_4$ having a larger capacitance than the capacitor $C_5$. The inductor $L_2$ is connected at one side to the chassis of the instrument and at the other side through a capacitor $C_7$ to the control grid of the valve $V_1$. Positive feed-back between the tuned-grid circuit and the tuned-anode circuit of the valve $V_1$ is provided by an air trimmer capacitor $C_6$ which is connected between the anode of the valve $V_1$ and the junction of the capacitors $C_4$ and $C_5$. This arrangement is an improvement over direct positive feed-back to the grid of the valve $V_1$ as it enables a larger and more stable capacitor to be used as the feed-back capacitor $C_6$.

The detector stage comprises a type 1S5 pentode valve $V_2$ the control grid of which is connected to the anode of the valve $V_1$ by way of a capacitor $C_8$ and to the chassis of the instrument by way of a resistor $R_1$ connected in series with a biasing battery $B_2$. The anode of the valve $V_2$ is connected through a resistor $R_2$ and a micro-ammeter M to the positive side of the H.T. battery $B_1$ and to the screen grid. The resistor $R_2$ is of the order of 100K ohms and protects the meter M against overloads but due to the constant current characteristic of the valve $V_2$ it has little effect on its sensitivity as an oscillation indicator. The anode of the valve $V_2$ is connected to the chassis of the instrument a by-pass capacitor $C_9$ and the positive side of the H.T. battery is also connected to the chassis by a similar capacitor $C_{10}$. The suppressor grid of the valve $V_2$ is strapped to one side of the cathode thereof and is connected to the chassis whilst the other side of the cathode thereof is connected to the other side of the cathode of the valve $V_1$ and through a switch S to the positive side of an L.T. battery $B_3$ the negative side of which is connected to the chassis. The negative side of the H.T. battery $B_1$ is connected to the control grid of the valve $V_1$ through a resistor $R_3$ and to the chassis through an automatic D.C. negative feed-back resistor $R_4$ which has a by-pass capacitor $C_{11}$ shunted thereacross.

Figure 2:
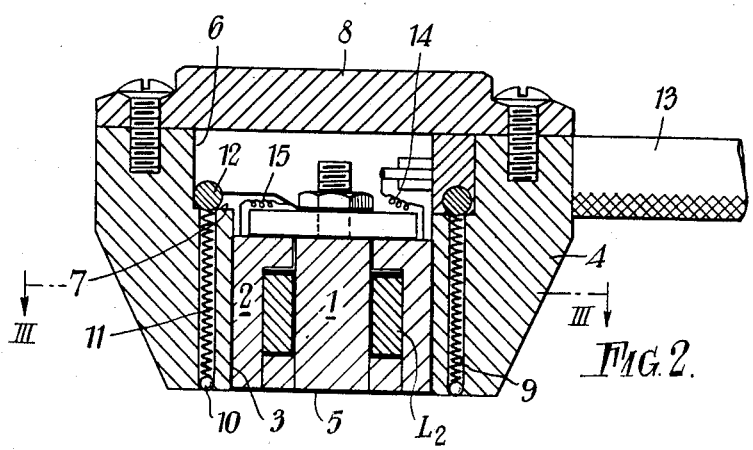
Figure 2 is a sectional view of the measuring head of the instrument taken on the line II—II of Figure 3.
Figure 3:
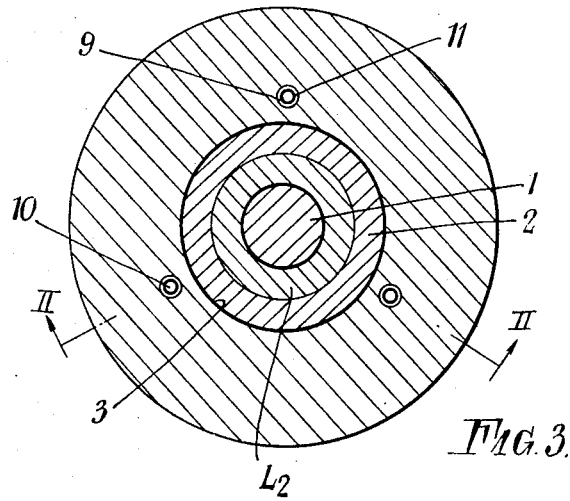
Figure 3 is a section taken on the line III—III of Figure 2.

The inductor $L_2$ is carried in an investigating or measuring head which is illustrated in Figure 2 and is formed by winding 500 turns of 40 S.W.G. enamelled wire on the inner member 1 of a dust-core assembly which is of rotated E-section to form a cylindrical member 2 and the inner member 1 which is co-axial with the member 2. The core assembly is disposed in a cylindrical bore 3 within a housing 4 and is provided with a cap 5 to close one end of the bore 3. The other end of the bore 3 is enlarged as at 6 to provide an annular shoulder 7 and is closed by a cover 8. Three passages 9 extend through the housing 4 parallel with the axis of the bore 3 and spaced equiangularly thereabout to open at one end into the shoulder 7. The passages 9 have their diameter reduced slightly at the extreme ends thereof remote from the shoulder 7 and a small ball 10 is dropped into each passage 9 to project beyond the reduced end thereof and to be retained thereby. A compression spring 11 is located in each passage 9 to bear at one end on the ball 10 and is retained in the passage by a metal ring 12 which clips into the enlarged part 6 of the bore 3 and rests on the shoulder 7. The investigating head is connected to the instrument by a length of coaxial cable 13 the outer conductor of which is connected to the chassis of the instrument and to the ring 12 and the inner conductor of which is connected electrically at one end by a conductor 14 to one side of the inductor $L_2$ and at the other end to the capacitor $C_7$. The other end of the inductor $L_2$ is connected by a conductor 15 to the ring 12.

In the use of the instrument described the switch S is closed and the investigating head is presented to the surface of the metal under test so that the three balls 10 rest on that surface thereof and space the inductor $L_2$ suitable distance therefrom whilst at the same time serving to electrically connect the metal under test to the chassis of the instrument thereby stabilising any stray capacitance of the coil of the inductor $L_2$. The effect of this stray capacity which may be observed when testing a sample having an insulating coating, is very small but the effect may be eliminated if desired by coating the complete core assembly with colloidal graphite, this coating being electrically connected through the balls 10 to the chassis of the instrument and acting as a Faraday shield around the core.

It will be appreciated that the conditions for oscillation of the oscillator stage depend upon the tuned impedance of the inductor $L_2$ and this, in turn, depends upon the material under test. It is convenient to make the constants of the oscillator stage such that it will oscillate at about 100 kc./s. The constants of the detector stage are so arranged that the valve $V_2$ is normally non-conducting when the oscillator stage is not oscillating. Under these conditions the valve $V_1$ draws substantially the total current from the H.T. battery $B_1$ and this current passes through the automatic D.C. negative feed-back resistor $R_4$ which provides a standing bias for the valve $V_1$ and stabilises the operation of the oscillator stage and makes it substantially independent of small variations in the magnitude of the H.T. battery $B_1$ such as are encountered in normal use. When the oscillator stage commences to oscillate, it will still draw the larger proportion of the total current and the resistor $R_4$ will still provide a stabilising effect whilst the increased feed-back which occurs when the valve $V_2$ conducts serves to limit the amplitude of the oscillations and to prevent any tendency to erratic behaviour.

The tuned-anode circuit of the valve $V_1$ is tuned to a frequency slightly higher than that to which the tuned-grid circuit is tuned. When the investigating head is laid on the surface of the metal under test the inductive impedance of the inductor $L_2$ decreases by an amount dependent upon the electrical conductivity of the metal and its resistive impedance increases. The oscillator stage will commence to oscillate when the in-phase gain of the positive feed-back due to capacitor $C_6$ exceeds unity. This gain is dependent upon several factors but it may be altered either by a change in the loss of the inductance of the inductor $L_2$ or by a change in the anode load impedance of the valve $V_1$ so that a variation in one value may be compensated by an alteration of the other. The anode load impedance is controlled by the capacitor $C_2$ which is calibrated in terms of units of electrical conductivity. Calibration drift of the instrument is small due to the effect of the feed-back resistor $R_4$ but adjustments may be made by means of the capacitor $C_3$.

Before making any quantitive measurements the instrument is left to stabilise for a few minutes after being switched on and the investigating head is then placed on the surface of a standard piece of metal of known electrical conductivity and the capacitor $C_2$ is set to a value corresponding to this known electrical conductivity which is preferably near one end of the scale. The capacitor $C_3$ is then adjusted until oscillations just commence as indicated by the meter M. The instrument is then ready for use but from time to time an additional check may be made on another standard piece of metal having a known conductivity at the other end of the scale. If the difference between the two readings is appreciably less than it should be then a battery replacement is necessary.

The investigating head is then placed on the surface of the metal under test and the capacitor $C_2$ is adjusted until oscillations just commence as shown by the meter M due to the valve $V_2$ commencing to pass current. The value of the electrical conductivity of the sample may then be read off the calibrated scale associated with the capacitor $C_2$. The sample under test should be of a size having a surface which is at least a little greater than the diameter of the face of the investigating head presented thereto and should have a thickness which is approximately at least three times the "skin depth" of current penetration at the operating frequency. The dimensions of the investigating head may be quite small so that it may be used to test a sample having a minimum diameter of about ¾ in. and a minimum thickness of .020 in.

It is to be noted that the spacing of the inductor $L_2$ from the surface of the metal under test is not critical for the following reasons:

If the investigating head is moved a small distance away from the surface the inductive impedance of the inductor $L_2$ increases and its resistive impedance decreases. As a result of the increase of inductive impedance, the frequency of oscillation of the grid circuit decreases. This reduces the anode circuit impedance and the positive feed-back to the grid is reduced. The decrease in the resistive impedance of the grid circuit tends to increase the positive feed-back and the circuit is so adjusted that this increase in feed-back is balanced by the decrease in feed-back due to the frequency change. When a different sample of metal is tested both the inductive impedance and the resistive impedance are varied in the same sense and this change is additive and may be measured by varying the impedance of the anode circuit by means of the capacitor $C_2$ as described.

It will be appreciated that from foregoing description that an electric measuring instrument for measuring the electrical conductivity of a metal may be constructed as a small battery-operated portable instrument the accuracy of which is substantially independent of small variations in the magnitude of the H.T. voltage such as are normally encountered in use with batteries. The instrument may be used in numerous applications, for example, it may be used for the identification or segregation of metals or alloys, for checking heat treatment procedures, for detecting flaws and for investigating any other process which alters the electrical conductivity of the metal or alloy.

The instrument may be used for measuring the thickness of conducting non-magnetic films on non-conducting materials for measuring the thickness of conducting non-magnetic materials and may also be used for measuring the thickness of non-conducting films on non-magnetic metals as will be understood. For such measurements the frequency to which the anode circuit is tuned is made lower than that to which the grid circuit is tuned.

What I claim is:

1. An electrical measuring instrument capable of measuring the electrical conductivity of a sample of metal comprising a tuned-anode tuned grid valve oscillator stage having a feed-back connection between its anode and grid circuits, an H.T. battery connected to said oscillator stage; a detector stage connected to said H.T. battery, said detector stage including a valve having at least a cathode, an anode and a control grid; said control grid being connected to the output circuit of the valve in the oscillator stage, the cathode of the valve in the oscillator stage being connected in parallel with the cathode of the valve in the detector stage, a meter connected in the output circuit of the detector stage, said meter being responsive to electric current passed by the detector stage, a D.C. negative feed-back resistor connected between said cathode and the negative pole of the H.T. battery, an L.T. battery connected in parallel with said cathodes with its negative pole connected to the end of said feed-back resistor remote from the negative pole of the H.T. battery, a feed-back connection from said end of said feed-back resistor to the grid circuit of said oscillator stage, and an on-off switch connected between the L.T. battery and said cathodes.

2. An instrument according to claim 1 wherein the valve of the detector stage is biased, so as to be substantially non-conducting when the oscillator stage is not oscillating, by a battery having one pole connected to the grid of the valve of the detector stage through a resistor and the other pole connected to the end of the feed-back resistor remote from the negative pole of the H.T. battery.

3. An electrical measuring instrument capable of measuring the electrical conductivity of a sample of metal comprising a vari-mu pentode valve which under operating conditions draws only a very small grid current, said vari-mu pentode valve constituting the valve of a tuned-anode tuned grid valve oscillator stage, the tuned-grid circuit of said oscillator stage comprising an inductance carried in an investigating head and a capacitance provided by two series-connected capacitors connected in parallel with said inductance and the tuned-anode circuit of the oscillator stage comprising an inductance having three variable capacitors connected in parallel thereacross, one of the said three variable capacitors being variable in a stepwise manner, a variable capacitor connected between the anode of the oscillator valve and the junction of said two series-connected capacitors to provide positive feed-back from the tuned-anode circuit to the tuned-grid circuit of the oscillator stage, an H.T. battery connected to said oscillator stage, a detector stage comprising a pentode valve having a substantially constant current characteristic and having its control grid coupled to the anode of the oscillator valve and its cathode connected in parallel with the cathode of said oscillator valve, said detector stage being connected to said H.T. battery, a meter connected in the output circuit of said detector stage, said meter being responsive to electric current passed by the detector stage, a D.C. negative feed-back resistor connected between the cathode of the valve of the oscillator stage and the negative pole of the H.T. battery, an L.T. battery connected in parallel with the cathodes of the valves, with its negative pole connected to the end of said feed-back resistor remote from the negative pole of the H.T. battery, a feed-back connection from said end of said feed-back resistor to the grid circuit of said oscillator stage, an on-off switch connected between the L.T. battery and said cathodes and a bias battery having one pole connected to the control grid of the valve in the detector stage through a resistor and having its other pole connected to the end of the feed-back resistor remote from the negative pole of the H.T. battery, the valve of the detector stage being biased by the bias battery so as to be substantially non-conducting when the oscillator stage is not oscillating.

4. An electrical measuring instrument capable of measuring the electrical conductivity of a sample of metal comprising a tuned-anode tuned-grid valve oscillator stage, the valve of which has at least an anode, a cathode and a control grid, a feed-back connection from the anode circuit of said oscillator stage to the grid circuit of said stage, a valve detector stage having at least an anode, a cathode and a control grid and having its control grid electrically connected to the anode of the oscillator stage, the cathodes of both stages being connected together, a source of H.T. supply common to both stages, a meter connected in the anode circuit of the detector stage and electrically connected to the positive pole of said source of H.T. supply, said meter being responsive to electric current passed by the detector stage, a common automatic D.C. negative feed-back means connected between both said cathodes and the negative pole of the source of H.T. supply and a feed-back connection from said feed-back means to the control grid of said oscillator stage.

5. An instrument according to claim 4 wherein said automatic D.C. negative feed-back means comprises a feed-back resistor.

6. An instrument according to claim 5 wherein a by-pass capacitor is connected in parallel across said feed-back resistor.

7. An instrument according to claim 4 wherein means is provided, normally to bias the valve included in the detector stage so as to render said valve substantially non-conducting when the oscillator stage is not oscillating.

8. An instrument according to claim 4 wherein the valve of the detector stage is a pentode valve having a substantially constant current characteristic.

9. An instrument according to claim 4 wherein the valve of the oscillator stage is a vari-mu pentode valve which under operating conditions draws only a very small grid current.

10. An electrical measuring instrument capable of measuring the electrical conductivity of a sample of metal comprising a tuned-anode tuned-grid valve oscillator stage, the valve of which has at least an anode, a cathode and a control grid, the tuned-grid circuit of said oscillator stage comprising an inductance and a capacitance provided by two series connected capacitors connected in parallel with said inductance, and the tuned-anode circuit of said oscillator stage comprising an inductance having two variable capacitors, connected in parallel with one another, connected thereacross, a variable capacitor connected between the anode of the oscillator valve and the junction of said two series-connected capacitors to provide positive feed-back from the tuned-anode circuit to the tuned-grid circuit of the oscillator stage, a valve detector stage having at least an anode, a cathode and a control grid, the latter being electrically connected to the anode of said oscillator stage and the cathodes of both stages being connected together, a source of H.T. supply common to both stages, a meter connected in the anode circuit of said detector stage and electrically connected to the positive pole of said H.T. supply, said meter being responsive to electric current passed by the detector stage, a common automatic D.C. negative feed-back means connected between both said stages and the negative pole of said H.T. source of H.T. supply and a feed-back connection from said feed-back means to the control grid of said oscillator stage.

11. An instrument according to claim 4 wherein the tuned-grid circuit of the oscillator stage comprises an inductance, a capacitance, provided by two series-connected capacitors, connected in parallel with said inductance and a variable capacitor is connected between the anode of the oscillator valve and the junction of said two series-connected capacitors to provide positive feed-back from the tuned-anode circuit to the tuned-grid circuit of the oscillator stage.

12. An instrument according to claim 4 wherein the tuned-anode circuit of the oscillator stage comprises an inductance having a variable capacitance connected thereacross.

13. An instrument according to claim 10 wherein one of said two variable capacitors connected in parallel is calibrated in terms of units of electrical conductivity.

14. An instrument according to claim 13 wherein the other of said two variable capacitors is an air trimmer capacitor.

15. An instrument according to claim 10 wherein a third capacitor is connected in parallel with said two variable capacitors connected in parallel across the inductance in the tuned-anode circuit.

16. An instrument according to claim 15 wherein said third capacitor is variable in steps to select ranges of conductivity measurable by the instrument.

17. An electrical measuring instrument capable of measuring the electrical conductivity of a sample of metal comprising a tuned-anode, tuned-grid valve oscillator stage having at least an anode, a cathode and a control grid, a feed-back connection from the anode circuit of said oscillator stage to the grid circuit of said stage, the inductance included in the tuned-grid circuit of said oscillator stage being carried in an investigating head, a detector stage having at least an anode, a cathode and a control grid, the latter being electrically connected to the anode circuit of the oscillator stage and the cathodes of the two stages being connected together, a source of H.T. supply common to both stages, a meter connected in the anode of the detector stage, said meter being responsive to current passed by the detector stage, a common automatic D.C. negative feed-back means connected between both cathodes and the negative pole of the source of H.T. supply and a feed-back connection from said feed-back means to the control grid of said oscillator stage.

18. An instrument according to claim 17 wherein the inductance included in the tuned-grid circuit of the oscillator stage is provided by an inductor wound on the inner member of a dust-core assembly which is of rotated E-section and is disposed in a cylindrical bore in the investigating head.

19. An instrument according to claim 18 wherein three passages are formed in said investigating head, said passages extending parallel to the axis of said cylindrical bore and being spaced equi-angularly about the axis of the latter so that the investigating head may be supported by said balls on a surface.

References Cited in the file of this patent

UNITED STATES PATENTS

| | | |
|---|---|---|
| 2,630,780 | Falck | Mar. 10, 1953 |
| 2,657,579 | Milsom | Nov. 3, 1953 |